(12) United States Patent  (10) Patent No.: US 9,303,421 B1
Jennings  (45) Date of Patent: Apr. 5, 2016

(54) SUSPENDED THEATER RIDE SYSTEM

(71) Applicant: Oceaneering International, Inc., Houston, TX (US)

(72) Inventor: Clifford Allen Jennings, Highland, MD (US)

(73) Assignee: Oceaneering International, Inc., Houston, TX (US)

(*) Notice: Subject to any disclaimer, the term of this patent is extended or adjusted under 35 U.S.C. 154(b) by 0 days.

(21) Appl. No.: 14/677,804

(22) Filed: Apr. 2, 2015

Related U.S. Application Data

(60) Provisional application No. 62/069,428, filed on Oct. 28, 2014.

(51) Int. Cl.
*A63J 5/12* (2006.01)
*A63G 31/16* (2006.01)
*E04H 3/30* (2006.01)
*F16M 13/02* (2006.01)

(52) U.S. Cl.
CPC *E04H 3/30* (2013.01); *A63G 31/16* (2013.01); *F16M 13/022* (2013.01)

(58) Field of Classification Search
CPC .................. A63J 3/00; A63J 5/00; A63J 5/02; A63J 5/12; A63G 7/00; A63G 31/00; A63G 31/16
USPC .................. 472/57, 59, 75, 80, 130, 131, 136; 434/29, 55; 212/312, 316
See application file for complete search history.

(56) References Cited

U.S. PATENT DOCUMENTS

| | | | | |
|---|---|---|---|---|
| 6,354,954 B1 * | 3/2002 | Sumner | A63G 31/16 | 472/45 |
| 6,406,299 B1 * | 6/2002 | Murao | B25J 9/104 | 434/29 |
| 8,147,344 B2 * | 4/2012 | Crawford | A63G 21/20 | 104/112 |
| 8,444,496 B2 * | 5/2013 | Lai | A63G 7/00 | 472/130 |
| 8,721,464 B2 * | 5/2014 | Ou Yang | A63G 31/16 | 434/55 |
| 8,920,251 B2 * | 12/2014 | Dietz | A63G 21/20 | 434/55 |

* cited by examiner

*Primary Examiner* — Kien Nguyen
(74) *Attorney, Agent, or Firm* — Maze IP Law, PC

(57) ABSTRACT

Various embodiments of load carrying systems comprise a load supporting frame comprising three or more connection points and an associated set of lifts configured which define six separate triangles defining separate planes configured to brace against surge, sway and yaw with respect to a support frame, such as unintended or unwanted surge, sway and yaw, while allowing intended and/or desired surge, sway and yaw.

20 Claims, 24 Drawing Sheets

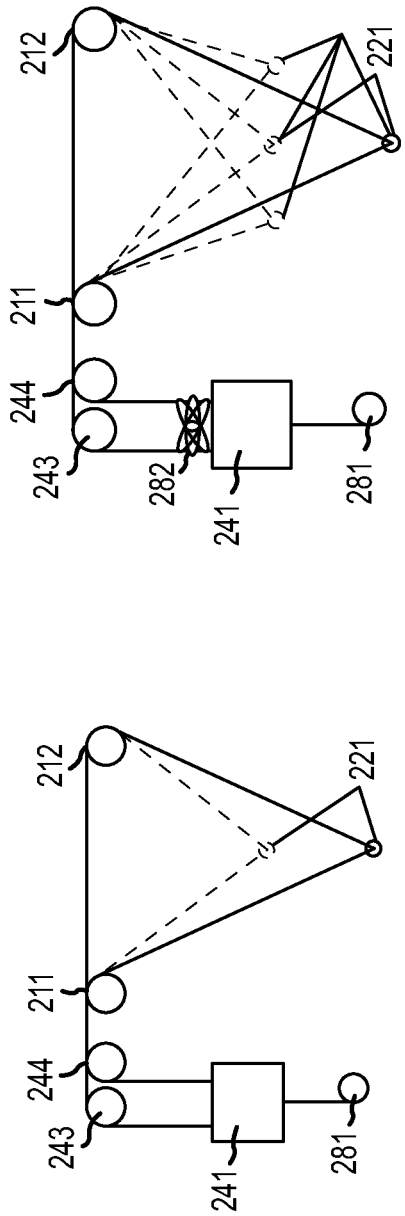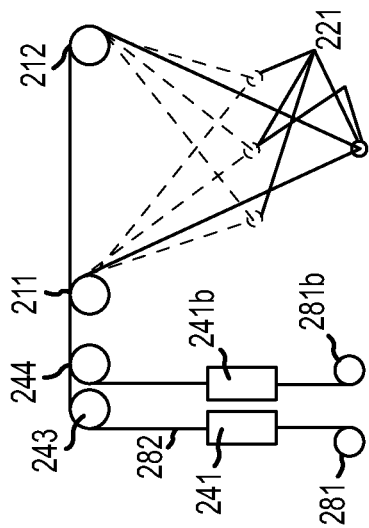
FIG.9a
FIG.9b
FIG.9c

US 9,303,421 B1

SUSPENDED THEATER RIDE SYSTEM

RELATION TO PRIOR APPLICATIONS

This application claims the benefit of, and priority through, U.S. Provisional Application 62/069,428, titled "Suspended Theater Ride System," filed Oct. 28, 2014.

BACKGROUND

Motion bases, including inverted motions bases, have been described in the art. However, certain of these motion bases, such as suspended motion bases, do not lessen or eliminate unwanted and/or unintended surge, sway or yaw.

DRAWINGS

Various figures are included herein which illustrate aspects of embodiments of the disclosed inventions.

FIGS. 9a-9c are schematic views of various exemplary configurations of counterweighted lift systems and illustrations of how they effect movement;

DESCRIPTION OF EXEMPLARY EMBODIMENTS

In the various embodiments disclosed herein, a support frame, which may be configured as an overhead frame, is supported via tension members which keep the frame stable and lessen or eliminate unwanted and/or unintended surge, sway or yaw; help retain heave, pitch and roll; and aid in rigging a system of which they are a part for ease of maintenance.

Figure 6:
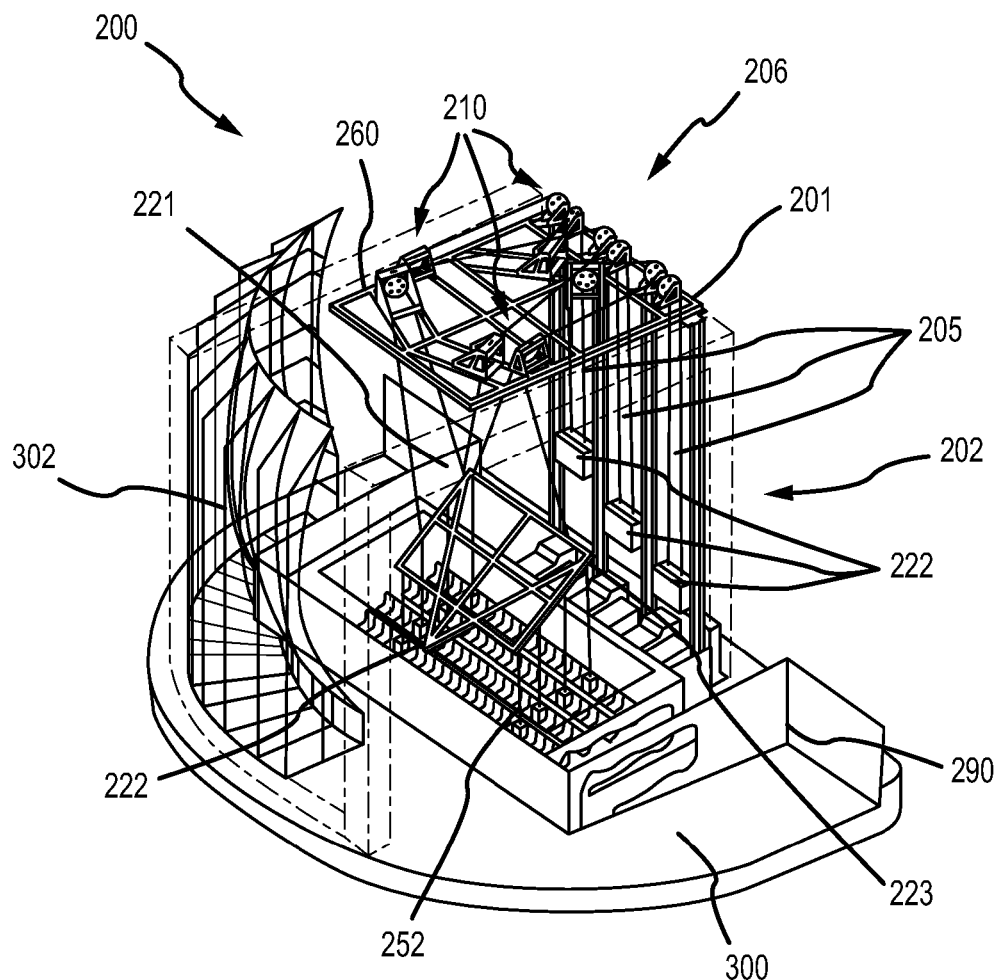
FIG. 6 is a view in partial perspective of a second exemplary load carrying system and a first exemplary theater system.

As used herein, "cable," "rope," "wire," and "chain" all refer generally to a flexible tensile and/or winchable element. Moreover, as will be familiar to those of ordinary skill in the controllable machinery arts, each described controller, by way of example and not limitation including programmable system controller 290 (FIG. 6) or 490 (FIG. 19), may be a single such controller, a plurality of controllers each assigned to a separate set of controlled devices, a set of redundant controllers arranged in with fail-safe redundancy, or the like, or a combination thereof. Further, the general references to a set of pulleys, e.g. pulley 11 or pulley 12, are meant to be illustrative and not limiting, e.g. pulleys 11 and 12 are not necessarily associated with pulleys 44-45.

Figure 1:
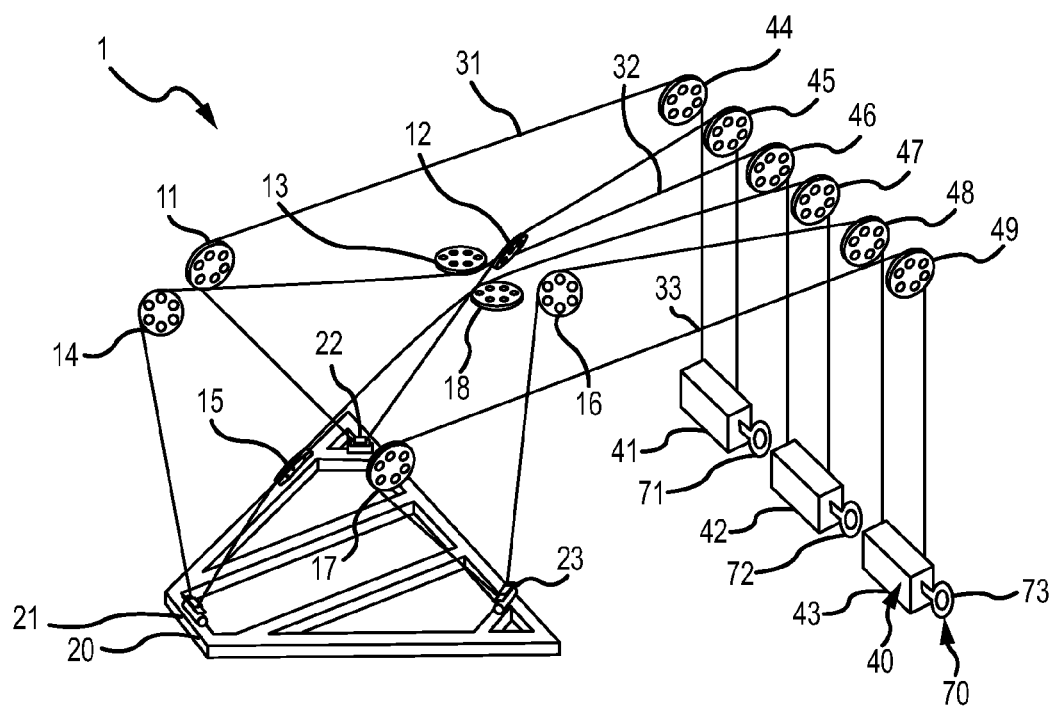
FIG. 1 is a view in partial perspective of a portion of a first exemplary load carrying system.
Figure 2:
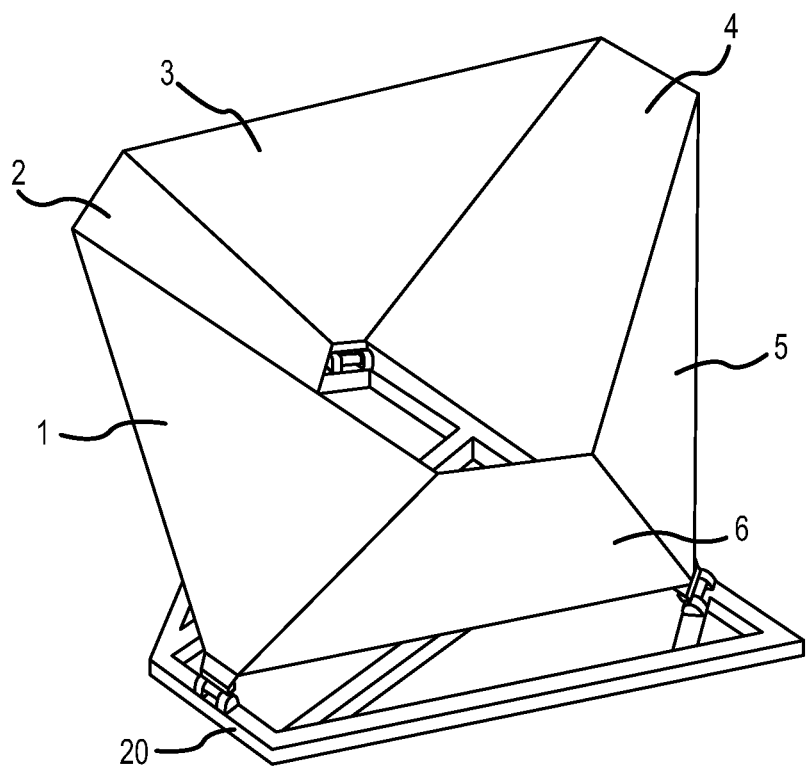
FIG. 2 is a view in partial perspective illustrating the six triangles which define separate planes configured to brace against surge, sway and yaw with respect to load supporting frame.
Figure 3:
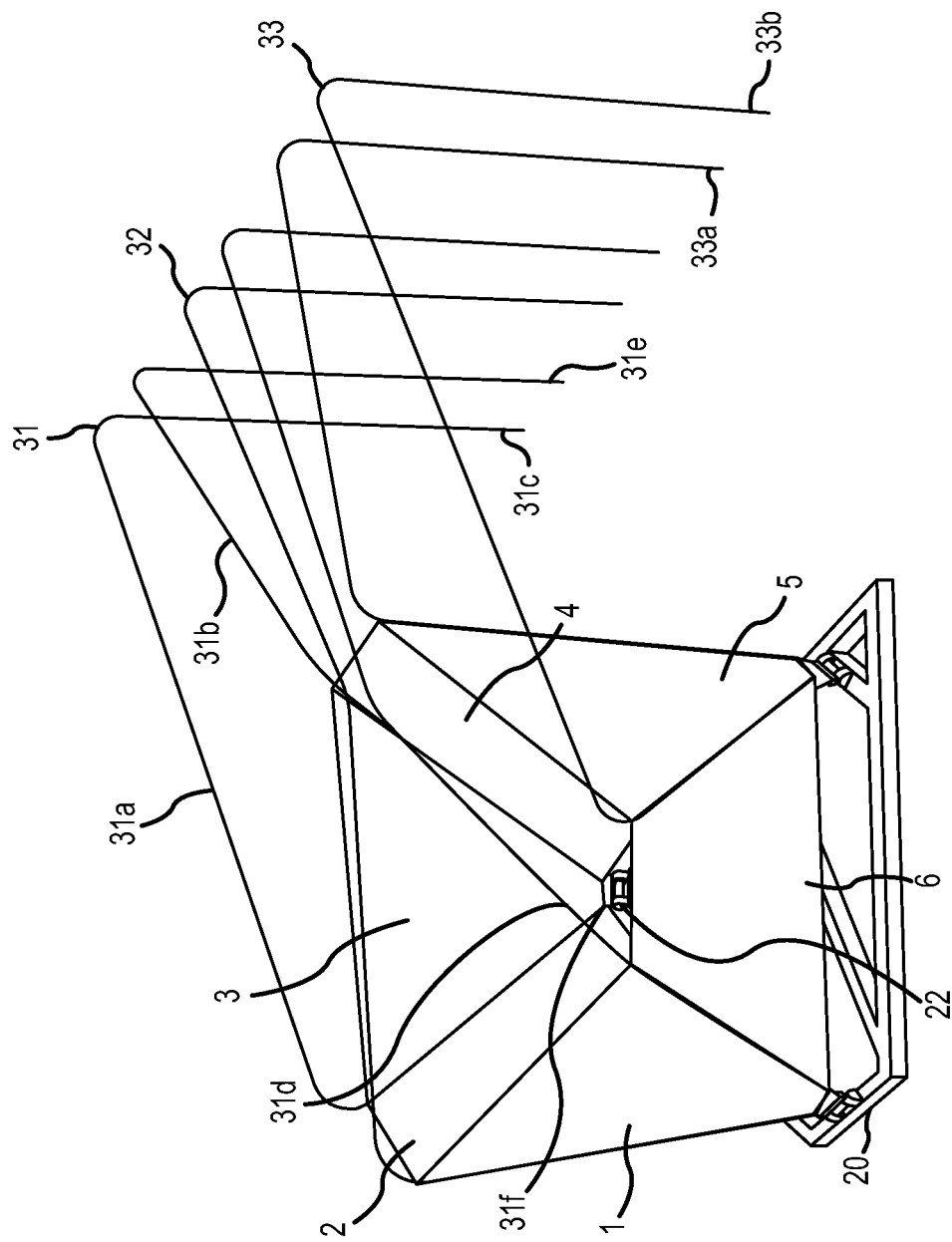
FIG. 3 is a further illustration of the separate planes and the exemplary load carrying system.

Generally referring to FIGS. 1-3, in a first embodiment, load carrying system 1 comprises load supporting frame 20, which further comprises three connection points, e.g. connection points 21,22,23; and three lifts 10 configured to be controlled independently with respect to vertical positioning of one of the three connection points 21,22,23. As illustrated in FIG. 1, the three lifts 10 (FIG. 3) define six separate triangles 1,2,3,4,5,6 which further define separate planes configured to brace against surge, sway and yaw with respect to load supporting frame 20, such as unintended or unwanted surge, sway and yaw, while allowing intended and/or desired surge, sway and yaw. Although lifts 10 may be configured to be controlled independently with respect to vertical positioning of one of the three connection points 21,22,23, two or more lifts 10 may be controlled to effect synchronicity.

Referring specifically to FIG. 3, each lift 10 comprises a controllable winch 70, e.g controllable winch 71, controllable winch 72, or controllable winch 73; a set of sheaves or other pulleys 11,12,13,14,15,16; and a corresponding set of cables 30, e.g. cable 31, cable 32, and cable 33, which are operatively attached to a respective controllable winch 70, routed over a respective set of pulleys, and routed to a predetermined connection point of the three connection points 21,22,13. Each cable 30 of cables 31,32,33 and load supporting frame 20 define two separate triangles of the six separate triangles 1-6. One or more connection point of the set of connection points 21,22,23 may comprise a swiveling connection, a U-joint, or the like, or a combination thereof.

Figure 4:
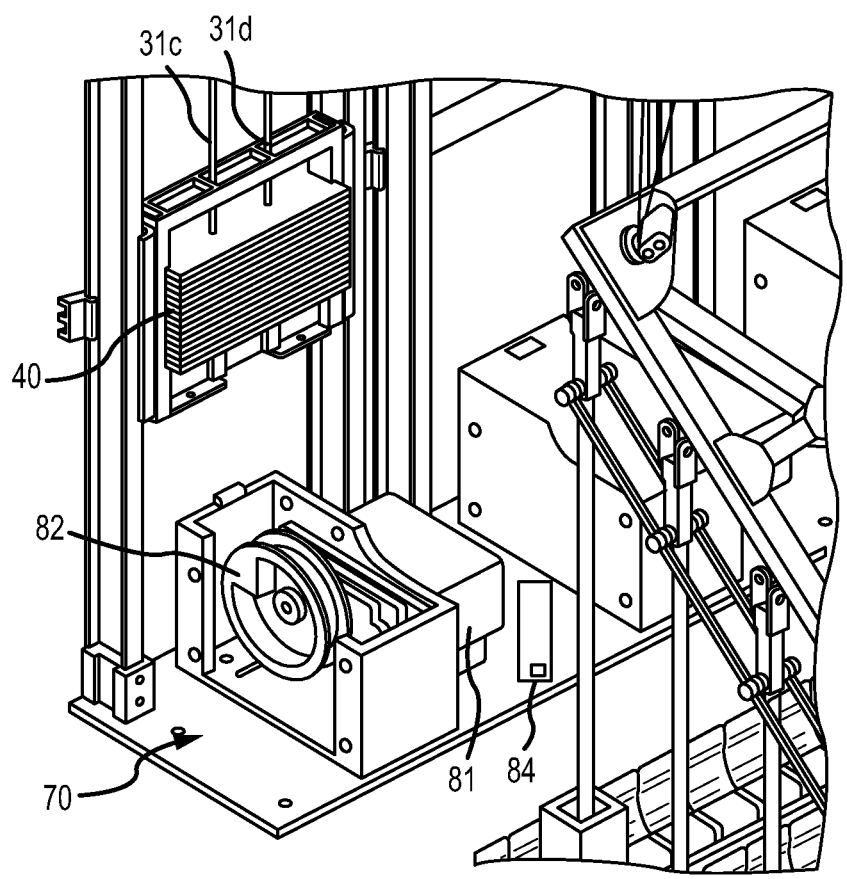
FIG. 4 is a cutaway view in partial perspective of an embodiment of a load carrying system illustrating an exemplary counterweight-winch configuration.

Referring additionally to FIG. 4, in contemplated embodiments, one or more counterweights 40, e.g counterweight 41, counterweights 42, and counterweights 43 are present for each of the three lifts 10, each counterweight 40 operatively connected to a respective cable 30 of the three cables 31,32,33.

Each set of pulleys of the three sets of pulleys (e.g., 11 and 12, 13 and 14, and 15 and 16) is typically similar if not identical to each other set. The description which follows for one set of pulleys is therefore similar if not identical to each of set of pulleys. A pulley set typically comprises first pulley, e.g. 11, disposed intermediate a predetermined connection point such as connection point 22 and one counterweight 40, e.g. counterweight 41, where first pulley 11 is further disposed proximate the predetermined counterweight 40, e.g. counterweight 41. The pulley set also typically comprises second pulley 12 disposed intermediate the predetermined connection point, e.g. connection point 22, and the predetermined counterweight 40, e.g. counterweight 41.

Other pulleys may be present. By way of example and not limitation, and referring back to FIG. 1, third pulley 44 may be disposed intermediate first pulley 11 and its corresponding predetermined counterweight, e.g. counterweight 41. Fourth pulley 45 disposed intermediate the second pulley 12 and its corresponding predetermined counterweight, e.g. counterweight 41. In certain embodiments, a pulley set may further comprise a fifth pulley, such as fifth pulley 13 or 18, disposed intermediate a first pulley, e.g. 14, and predetermined connection point such as connection point 21 proximate the predetermined connection point.

Each winch 70 may be configured to accept a predetermined length of a corresponding cable 30 about a portion of winch 70. In certain embodiments, each winch 70 is operatively connected to a corresponding counterweight 40.

In certain embodiments, and additionally referring generally to FIG. 3, each cable 30 comprises a first end, e.g. first cable end 33*a*, and a second end, e.g. second cable end 33*b*, where each of first cable end 33*a* and second cable end 33*b* are terminated at a corresponding winch 70 and/or counterweight 40. In other embodiments, cable 30, e.g. cable 31, comprises first cable 31*a*, comprising first cable end 31*c*, terminated at winch 70 (the termination is not illustrated) or counterweight 40 (FIG. 4), and second cable end 31*d* terminated at the predetermined connection point such as connection point 22, and second cable 31*b*, comprising first cable end 31*e*, terminated at winch 70 (the termination is not illustrated) or counterweight 40 (FIG. 4), and second cable end 31*f* terminated at the predetermined connection point, e.g. connection point 22.

Referring generally to FIG. 4, in embodiments, as will be familiar to those of ordinary skill in the mechanical support structure arts, each winch 70 may comprise a plurality of winches 70. Typically, each winch 70 further comprises selectively controllable motor 81 operatively connected to drum 82, which may further comprise a plurality of drums 82*a*,82*b* (not shown in the figures as such will be obvious to those of ordinary skill in these arts; see, e.g. FIG. 9*c*). In these configurations, each cable 30 may comprise first end 31*c* attached to first drum 82*a* and second end 31*d* attached to second drum 82*b*. In contemplated embodiments, one or more winches 70 may further comprises first selectively controllable motor 81*a* operatively (not shown in the figures as such will be obvious to those of ordinary skill in these arts) connected to first drum 82*a* and second selectively controllable motor 81*b* (not shown in the figures as such will be obvious to those of ordinary skill in these arts) operatively connected to second drum 82*b*. Each of first selectively controllable motor 81*a* and second selectively controllable motor 81*b* may be controllable independently of each other, synchronously, or the like, or a combination thereof.

Winch controller 84 is typically present and operatively in communication with one or more the three controllable winches 70. In embodiments, winch controller 84 comprises two or more winch controllers 84 which may be arranged redundantly or independently, e.g. a separate winch controller 84 for each controllable winch 70.

Figure 5:
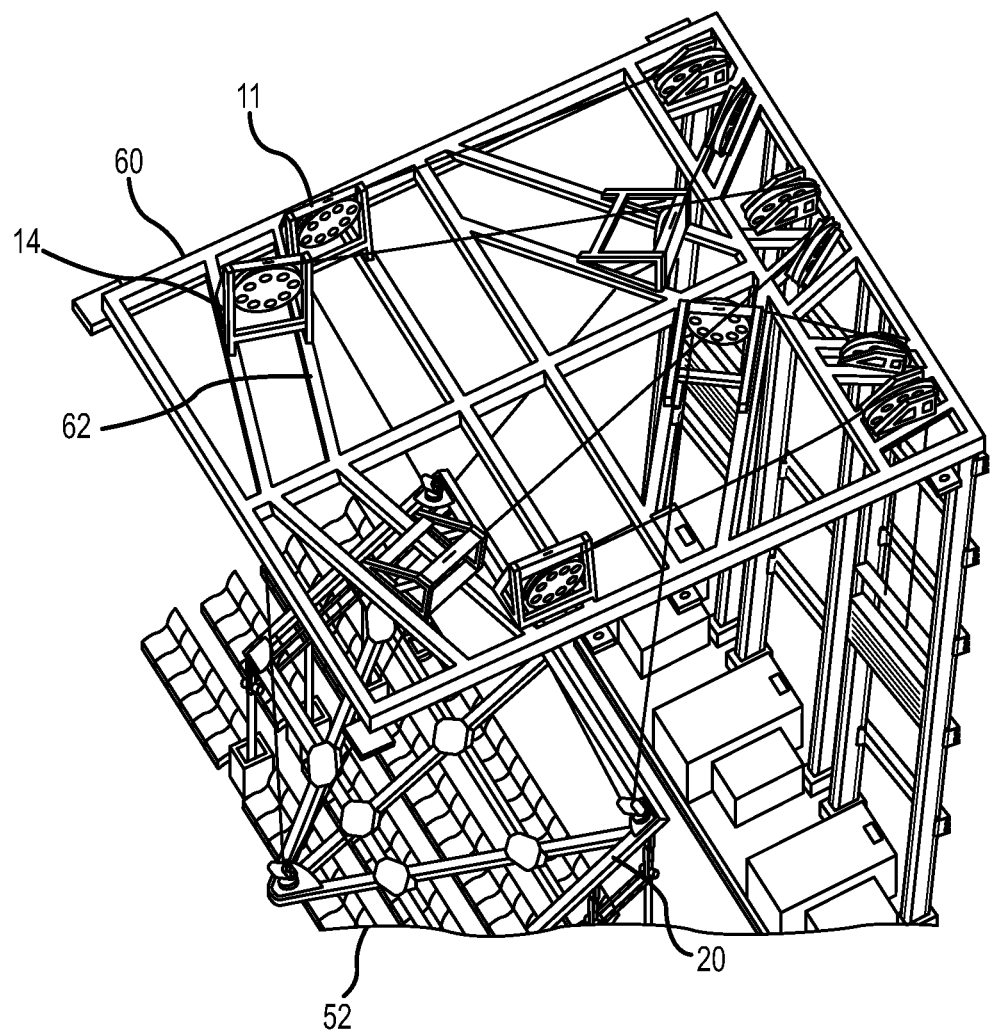
FIG. 5 is a cutaway view in partial perspective of an exemplary load carrying system.

Referring generally to FIG. 5, in certain embodiments load carrier 52 is present and connected to load supporting frame 20. Although illustrated as a passenger seating area, load carrier 52 could be of any suitable type, by way of example and not limitation including a general cargo carrier such as a pallet or container platform. In some of these embodiments, load carrier 52 is suspended from load supporting frame 20 such as by being suspended underneath load supporting frame 20.

In certain embodiments, lift support 60, e.g. rails or the like, may be present and configured to support one or more lifts 10. Where lift support 60 is present, one or more lift movers 62 may also be present and operatively connected to the supported lift 10. These lift movers 60 are typically configured to allow for controlled movement of the supported lift 10 and/or some of its components about lift support 60 in a predetermined plane, e.g. pulley 14. This controlled movement may be independent of each other controlled movement of each selectively controllable mover 62, performed synchronously, or a combination thereof.

Referring generally now to FIGS. 6-18, in a second embodiment, seating system 200 comprises vertical guide 202, lift support 260, load carrying system 206 comprising load supporting frame 220, and one or more passenger carriers 252 connected to load supporting frame 220. Passenger carrier 252 is typically configured to support a plurality of human passengers.

Vertical guide 202 comprises one or more supports 207, each comprising an upper portion 204; lower portion 203 disposed opposite the upper portion; and counterweight guide 205 disposed intermediate upper portion 204 and lower portion 203.

Lift support 260 is connected to support 207 proximate upper portion 204.

Load carrying system 206, which is typically supported by lift support 260, typically comprises load supporting frame 220, comprising three connection points 221,222,223, and three lifts 210 which may be configured to be controlled independently with respect to each other to achieve independent vertical positioning of one of the three connection points 221,222,223. As with the first embodiment, this controlled movement may be independent of each other controlled movement of each selectively controllable motor 281, performed synchronously, or a combination thereof.

As with the first embodiment as well, three lifts 210 define six separate triangles 1,2,3,4,5,6 defining separate planes configured to brace against surge, sway and yaw with respect to the frame. Each lift 210 typically comprises counterweight 240 such as counterweight 241,242,243 movably disposed about counterweight guide 205, which may interpreted as including being disposed at least partially within counterweight guide 205; controllable winch 270 operatively connected to its associated counterweight 240; a set of pulleys 211,212,213,214,215,216; and a set of cables 230 (e.g., cables 231,232,233 (FIG. 10*a*)) operatively attached to a specific controllable winch 270 and routed over the set of pulleys to a connection point of the three connection points 221,222,223. Each set of cables 230 and load supporting frame 220 define two separate triangles of the six separate triangles.

One or more winches 270 may be disposed proximate bottom portion 209 of vertical guide 202 and operatively connected to a corresponding set of counterweights 240 to move counterweights 240 within an associated counterweight guide 205. In these configurations, the set of pulleys 211,212,213,214,215,216 are typically disposed about lift support 260.

Referring additionally to FIGS. 8, 9*a*, 9*b*, and 9*c*, one or more of winches 270 may further comprise first selectively controllable motor 281*a* operatively connected to first drum 282*a* and second selectively controllable motor 281*b* operatively connected to second drum 282b. These, in turn, may be connected to a corresponding plurality of counterweights, e.g. 241a and 241b.

Each winch 270 typically is configured to accept a predetermined length of a corresponding cable 230 about a portion of that winch 270. Cable 230 may be configured similarly to cable 30 described above, e.g. with a first end and a second end, each of which are terminated at winch 270 and/or a corresponding counterweight 240.

Passenger carrier 252 may be connected to load supporting frame 220 by connection 255 which may comprise a jointed connection, a U-joint, or the like, or a combination thereof.

One or more winch controllers 284 may be present and operatively in communication with one or more controllable winches 270. In embodiments, winch controller 284 comprises two or more winch controllers 284 which may be arranged redundantly or independently, e.g. a separate winch controller 284 for each controllable winch 270.

Typically, one or more programmable system controllers 290 (FIG. 6) is also present and operatively in communication with one or more winch controllers 284. By way of example and not limitation, a set of winch controllers 284, e.g. one to three winch controllers 284, may be operatively connected to an associated, predetermined controllable winch 270 and at least one programmable system controller 290 may be operatively in communication with each such winch controller 284.

One or more connection points, e.g. 221, of the set of connection points 221,222,223 may comprise connection 254 (FIG. 15) which may comprise a swiveling connection, a U-joint, or the like, or a combination thereof.

Referring back to FIGS. 10a and 10b, additionally, in certain embodiments one or more substantially inflexible support rods 256 may be present and configured to connect passenger carrier 252 to load supporting frame 220. One or more cross-bracing pieces 257 may be connected to one or more of the substantially inflexible support rods 256, e.g. swivelingly connected to substantially inflexible support rod 256.

In configurations, lift support 260 may comprise a plurality of rails 261 or the like and on which one or more lifts 210 or various lift components such as pulleys, e.g, pulley 214, may be mounted such as on lift support 263. In such configurations, one or more selectively controllable movers 262 may be present and a specific lift support 263 may be configured to be connected to a corresponding selectively controllable mover 262 and configured to allow travel of lift 210 and/or one of its components such as pulley 214 about that specific lift support 260. This controlled movement may be independent of each other controlled movement of each selectively controllable mover 262, performed synchronously, or a combination thereof. As illustrated in FIGS. 9a-9c, various embodiments allow for movement relative to a connection point such as 221.

In certain contemplated embodiments support 206 comprises one or more rails 203, these rails 203 defining a further plurality of counterweight guides 205.

Referring back to FIG. 6, in a further embodiment, seating system 200 may be incorporated into theater 300 which, in addition to seating system 200, comprises theater space 301 and image screen 302 disposed within theater space 301 where image screen 302 typically comprises an area comprising a curved surface. Seating system 200 is typically disposed opposite image screen 302 at least partially within theater space 301. In a theater application, there may be no inherent need for overhead winch placement and, typically, all cables 230 are routed over and down to a more convenient winch location. Due to rigging, frame stability is retained.

Passenger carrier 252 is typically connected to load supporting frame 220 such that the human passengers contained in passenger carrier 252 are facing image screen 302 at least some of the time.

Connection of passenger carrier 252 to the load supporting frame 220 may comprise one or more support rods 253 disposed intermediate passenger carrier 252 load supporting frame 220 and connected to load supporting frame 220 such as by using a U-joint.

Referring now to FIGS. 16-20c, in a third embodiment, load carrying system 400 comprises load supporting frame 420, comprising three connection points 421,422,423, and three lifts 410 configured to be controlled independently with respect to vertical positioning of one of the three connection points, the three lifts defining six separate triangles 1,2,3,4,5,6 (FIG. 2) defining separate planes configured to brace against surge, sway and yaw with respect to load supporting frame 420.

In a ride system, e.g. a suspended dark ride, cable control typically must travel with a passenger support frame and be packaged tightly with a passenger carrier, which can comprise a cabin, transport system, or a combination thereof. By way of example and not limitation, load carrying system 400 can be located either up in passenger carrier transport 402 or down on roof 453 of passenger carrier 452.

Figure 18:
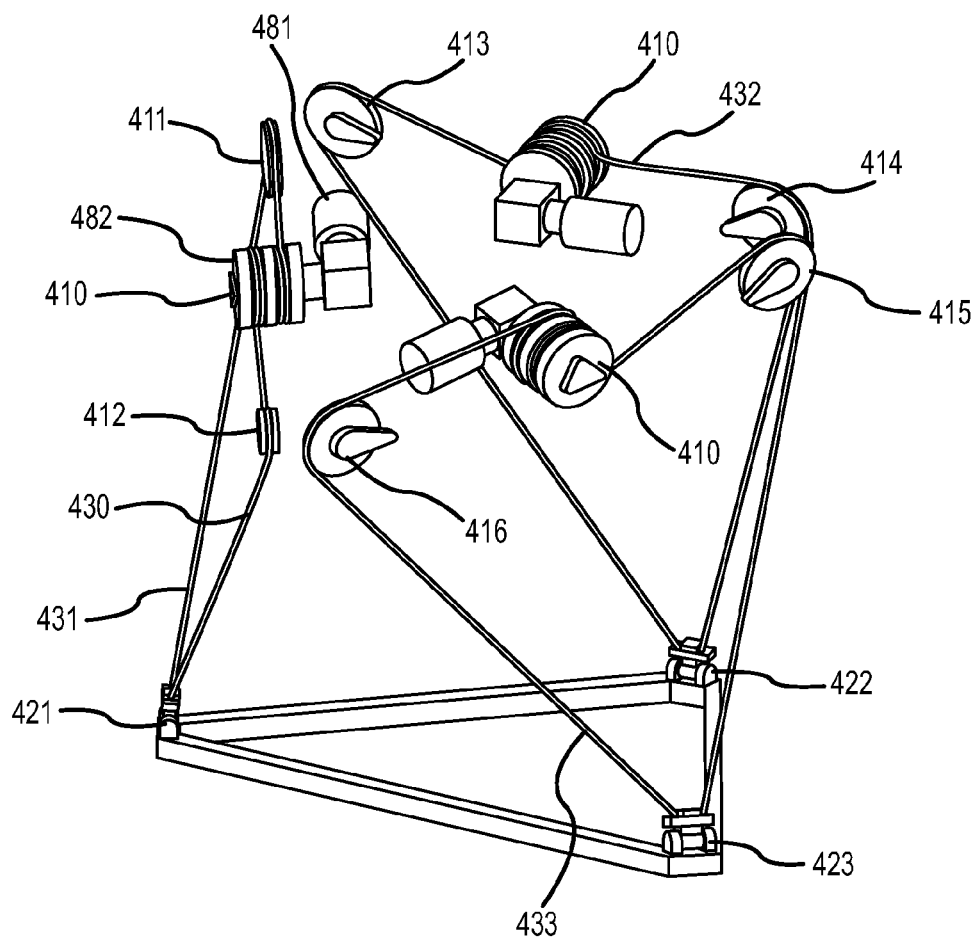
FIG. 18 is a view in partial perspective of an exemplary lift configuration for the amusement ride system.
Figure 19:
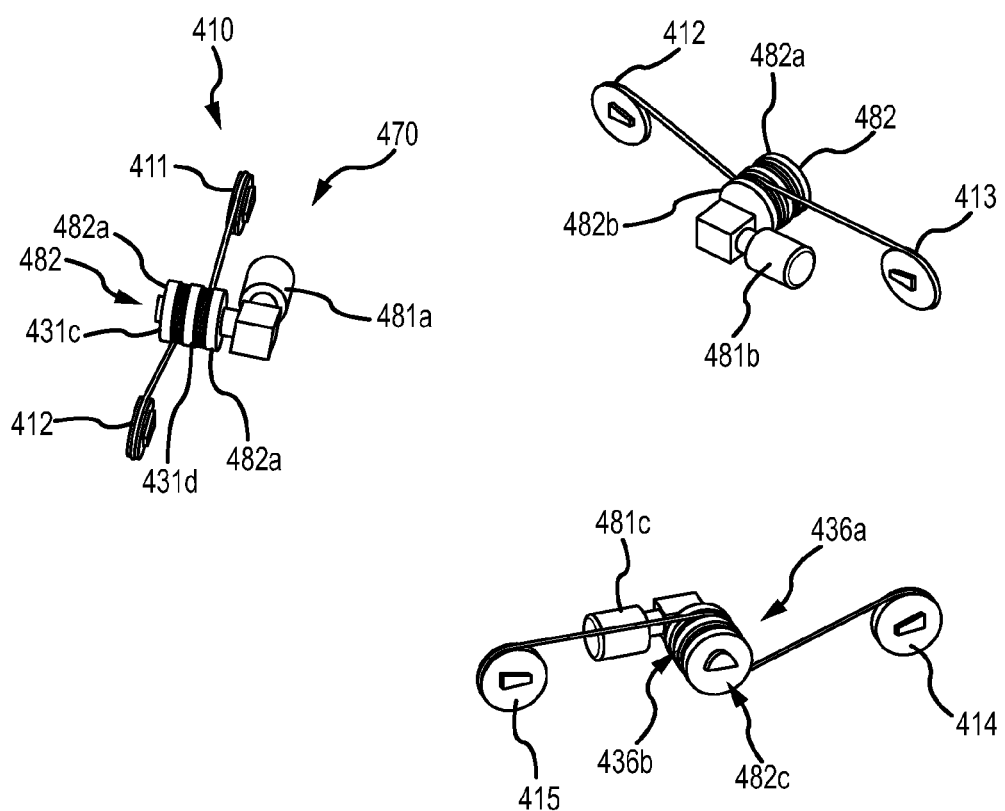
FIG. 19 is a view in partial perspective of portions of the exemplary lift configuration for the amusement ride system and FIGS. 20a-20c are schematic illustrations of how a non-counterweight configuration can effect movement.

Referring additionally to FIGS. 18-19, each lift 410 typically comprises one or more controllable motors 481; one or more drums 482 operatively connected to a corresponding controllable motor 481 and configured to accept a predetermined length of a corresponding cable 430 about a portion of each such drum 482; a set of pulleys 411,412,413,414,415, 416; and one or more cables 430, e.g. cables 431,432,433 routed over the set of pulleys and to, and in some embodiments through, a predetermined connection point of the three connection points 421,422,423. Each cable 430 typically comprises first cable end 436a attached to drum 482 and second cable end 436b cooperatively attached to drum 482. As before, each cable 430 and its associated portion of load supporting load supporting frame 420 define two separate triangles of the six separate triangles.

In an embodiment, each set of pulleys of the three sets of pulleys comprises a first pulley, e.g. pulley 411, disposed intermediate a predetermined connection point of the three connection points, e.g. 421, and a second pulley, e.g. pulley 412, disposed opposite the first pulley intermediate the predetermined connection point of the three connection points and a drum of the associated lift 410, e.g. drum 482.

As in the other embodiments, controllable motor 481 may comprise a plurality of controllable motors, e.g. 481a,481b, 481c. Each controllable motor 481 may be configured to be controlled synchronously and/or independently of each other controllable motor 481. Moreover, drum 482 may comprise a plurality of drums 482a,482b. In these configurations, each drum 482a,482b is typically operatively connected to a distinct controllable motor, e.g. 481a. In other embodiments, each drum 482 may be operatively connected to a distinct controllable motor, e.g. drum 482a may be connected to 481a and drum 482b to a collocated but separate, distinctly controllable motor (not shown in the figures). In embodiments where drum 482 comprises a plurality of drums, e.g. drums 482a and 482b, cable 430 typically comprises first cable end 436a attached to first drum 482a and second end 436b attached to second drum 482b. As in other embodiments, each cable 430 may comprise two or more separate cables 430.

One or more motor controllers 484 may be present and operatively in communication with one or more controllable motors 481. The plurality of controllable motors 481 may be configured to be controlled synchronously and/or independently.

Figure 20C:
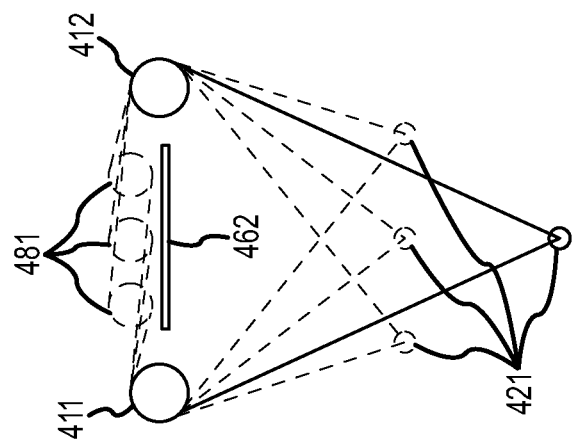
Figure 20B:
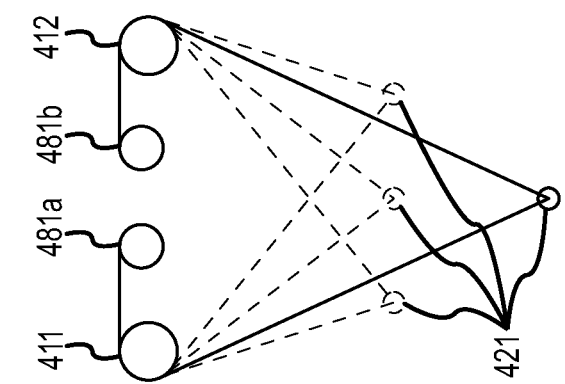
Figure 20A:
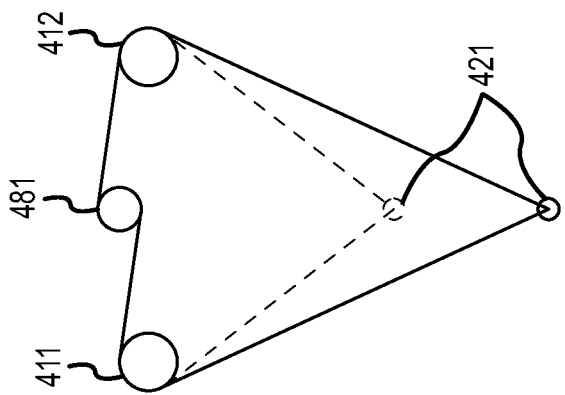

In embodiments, each controllable motor 481 controls vertical positioning of one of the frame swivel attachments such as may be at a connection point, e.g. 421. Various types of exemplary non-counterweight positioning is illustrated in FIGS. 20a-20c.

Referring back to FIGS. 16-17, load carrying system 400 typically comprises lift support 460, disposed intermediate load supporting frame 420 and lifts 410 and configured to support lifts 410. In embodiments, lift support 460 usually comprises a shape substantially congruent with a shape of load supporting frame 420. The set of pulleys 411,412,413, 414,415,416 is typically disposed towards an outer boundary of lift support 460 and/or between its supported pulleys.

Load carrying system 400 may further comprise one or more lift movers 462 operatively connected to one or more supported lifts 410. Each lift mover 462 may be configured to allow for controlled movement of its associated, supported lift 410 about lift support 460 in a predetermined plane, e.g. along an outer boundary of lift support 460. For embodiments with multiple controllable motors 481, lift mover 462 may comprise a plurality of lift movers 462, e.g. a first lift mover 462, operatively connected to first controllable motor 481a and operatively configured to allow for controlled movement of first controllable motor 481a about lift support 460 in a predetermined plane and a second lift mover 462, operatively connected to second controllable motor 481b and operatively configured to allow for controlled movement of second controllable motor 481b about lift support 460 in the predetermined plane.

Amusement ride seating system 500 may incorporate load carrying system 400 and load carrier 450 which is typically connected to load supporting frame 420. In embodiments, load carrier 450 is suspended from load supporting frame 420.

In an embodiment, amusement ride seating system 500 further comprises passenger carrier support 401, which can comprise one or more tracks or rails or the like, passenger carrier motion base 470, and passenger carrier 452. One or more passenger carrier motion base controllers 473 are operatively in communication with controllable passenger carrier motion base mover 470.

Passenger carrier motion base 470 is movably in communication with and typically suspended underneath passenger carrier support 401 and typically comprises one or more controllable passenger carrier motion base movers 403 in communication with passenger carrier support 401. Controllable passenger carrier motion base movers 403 are configured to controllably move passenger carrier motion base 470 about passenger carrier support 401.

Passenger carrier motion base 470 may further comprise rotator 471 and turntable 472, where turntable 472 is rotatably connected to rotator 471 about a rotational center of turntable 472 and operatively in communication with programmable system controller 490. All or a portion of rotator 471 and/or turntable 472 and/or passenger carrier motion base 470 may be located above passenger carrier support 401 such that passenger carrier support 401 is disposed in-between one or more of those components and passenger carrier 452.

Passenger carrier 452 may be suspended underneath and supported by passenger carrier motion base 470. Passenger carrier 452 is usually configured to accommodate passenger seating for one or more passengers. In these configurations, load carrying system 450 is typically connected to passenger carrier motion base 470 and passenger carrier 452 and disposed intermediate passenger carrier motion base 470 and passenger carrier 452.

Passenger carrier 452 may or may not comprise roof 453. Lifts 410 are typically located proximate passenger carrier transport 402 and where roof 453 is present lifts 410 may be located proximate roof 453. As before, the plurality of controllable motors 481 may be configured to be controlled synchronously or independently. By way of further example and not limitation, simultaneous rotational movement of controllable motors 481 for a given lift 410 may operate to move passenger carrier 452 up and down relative to passenger carrier support 402.

One or more programmable system controllers 490 are operatively in communication with passenger carrier motion base controller 473 and motor controller 484.

Lifts 410 may be configured such that that rotational movement in a first direction imparts a lengthening of first cable portion 431c and a shortening of second cable portion 431d, and reversing the rotation movement accomplished the opposite effect.

In the operation of various embodiments, in a first embodiment a load supported by frame 20 may be supported while bracing against surge, sway and yaw with respect to frame 20 by providing load carrying system 1, which is as described above. For each lift 10 of the three lifts 10, first end 33a of each cable 30 is connected to an associated controllable winch, e.g. controllable winch 70. Cable 30 is routed over an associated set of pulleys 11,12,13,14,15,16 to and, in some embodiments through, a predetermined connection point of the three connection points 21,22,23. Second end 33b of each cable 30 is then connected to its corresponding controllable winch 70 and lifts 10 used to support frame 20 while bracing against surge, sway and yaw with respect to frame 20 by altering a relative length of cable 30. As described herein, cable 30 may comprise a single, continuous cable 30 with two separate ends, 33a and 33b or two separate cables 31a and 31b.

Each lift 10 may be controlled independently of each other lift 10. Where controllable winch 70 comprises first selectively controllable motor 81a, first drum 82a operatively connected to first selectively controllable motor 81a, second selectively controllable motor 81b, and second drum 82b operatively connected to second selectively controllable motor 81b, using lifts 10 to support frame 20 while bracing against surge, sway and yaw with respect to frame 20 by altering a relative length of cable 30 may further comprise controlling each of first selectively controllable motors 81a and 81b independently and/or synchronously.

In a further embodiment seating system 200 which is load braced against surge, sway and yaw may be provided by providing vertical guide 202, which is as described above and load carrying system 206 supported by lift support 260, as described above.

For each of lifts 210, ends of each cable 230 are connected to its respective associated counterweight, e.g. counterweight 240. Cable 230 is routed over an associated set of pulleys 211,212,213,214,215,216 and to, and in some embodiments through, a predetermined connection point of the three connection points 221,222,223.

As described above, passenger carrier 252 is connected to load supporting system 220 and configured to support a plurality of human passengers.

Lifts 210 are used to support load carrying system 206 while bracing against surge, sway and yaw with respect to 220 frame by altering a relative length of one or more cables 230.

Each lift 210 may be controlled independently of each other lift 210, synchronously, or a combination thereof.

In embodiments where seating system 200 further comprises one or more winch controllers 284 operatively connected to each controllable winch 270 and one or more programmable system controllers 290 operatively in communication with one or more winch controllers 284, using lifts 210 to support load carrying system 206 may further comprise using one or more of the programmable system controllers 290 to issue one or more commands to one or more of the winch controllers 284 to effect a desired position of each counterweight 240 with respect to each counterweight's associated counterweight guide, e.g. 205.

In a further embodiment, presentation of an image within a theater may comprise providing theater 300, as described above, and creating a visual and/or audiovisual presentation susceptible to perception of movement. A software program is created to affect movement of passenger carrier 252 which is synchronized to the visual presentation.

One or more passengers are allowed to enter passenger carrier 252 and, at a predetermined time, the visual presentation is displayed on image screen 302. As it is being displayed, the software program, running in programmable system controller 290, is used to control each controllable winch 270 to affect movement of passenger carrier 252 synchronized to the displayed presentation.

As illustrated in FIGS. 13a-13d, various pitch and roll motions can be achieved using the ropes and their associated winch/motor/pulley assemblies:

In a further embodiment, travel of amusement ride vehicle such as passenger carrier 452, as in a dark ride system, comprises providing passenger carrier support 401, which is as described above. Passenger carrier motion base mover 403 is supported by passenger carrier support 401. Controllable passenger carrier motion base 470 is supported by passenger carrier motion base mover 403.

In a preferred embodiment, passenger carrier 452 is suspended underneath and supported by passenger carrier motion base 470, where passenger carrier 452 is as described above. As described above, controllable passenger carrier motion base 470 is configured to impart motion to passenger carrier 452 with a plurality of degrees of freedom.

One or more programmable system controllers 490 are placed into communication with one or more passenger carrier motion base controllers 473, one or more motor controllers 484, and one or more passenger carrier mover controllers 474.

One or more passenger carrier mover controllers 474 are placed into communication with an associated set of controllable passenger carrier base movers 403 and a predetermined set of passenger carrier mover control signals sent from programmable system controllers 490 to passenger carrier mover controllers 474 which effectively command the passenger carrier mover controllers 474 to send a further predetermined set of passenger carrier mover control signals to passenger carrier movers 403 to effect movement of passenger carrier mover 403 about passenger carrier support 401.

Additionally, passenger carrier motion base controller 473 is operatively placed the in communication with controllable passenger carrier motion base 470 and a further predetermined set of motion base control signals sent from one or more programmable system controllers 490 to one or more passenger carrier motion base controllers 474 to command passenger carrier motion base controllers 474 to send a further predetermined set of motion base control signals to controllable passenger carrier motion bases 470 to affect movement of the associated passenger carrier motion base 470.

Further, motor controllers 484 may be placed into communication with an associated set of controllable motors 481 and a further predetermined set of motor control signals sent from programmable system controllers 490 to one or more motor controllers 484, commanding them to send a further predetermined set of motor control signals to each controllable motor 481 to affect altering a relative length of one or more of their associated cables 460 to achieve bracing against surge, sway and yaw with respect to frame 420.

In various embodiments, passenger carrier 452 travels along a length of passenger carrier support 401. In other embodiments, passenger carrier 452 may be guided along a predetermined path, suspended from passenger carrier transport 402 which comprises passenger carrier motion base 470 capable of further movements, e.g. circumferentially with respect to a connector and/or supporting the traversal of a path defined by passenger carrier support 401. Movement may be achieved by lifting or lowering passenger carrier 452 at various positions from cables or chains attached to load carrying system 450, e.g. cables 430.

Figure 12:
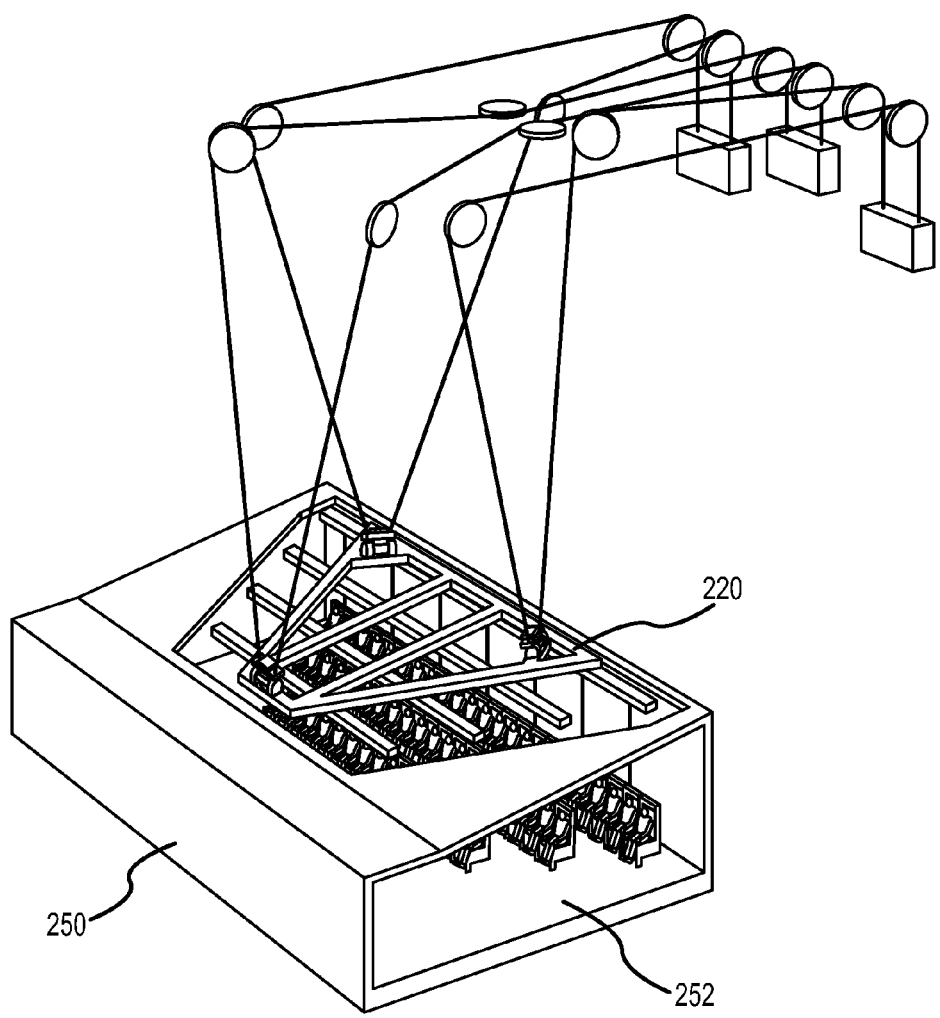
FIGS. 12 and 13a-13d are views in partial cutaway perspective of a theater seating arrangements in various loading, pitch, and yaw positions.
Figure 13A:
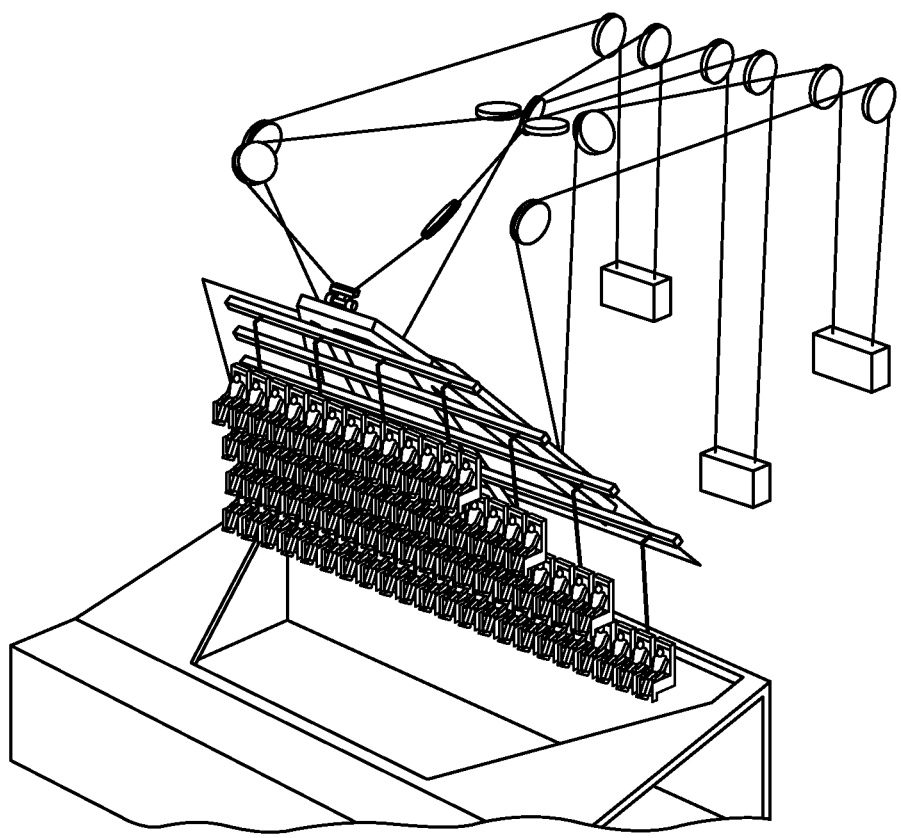
Figure 13B:
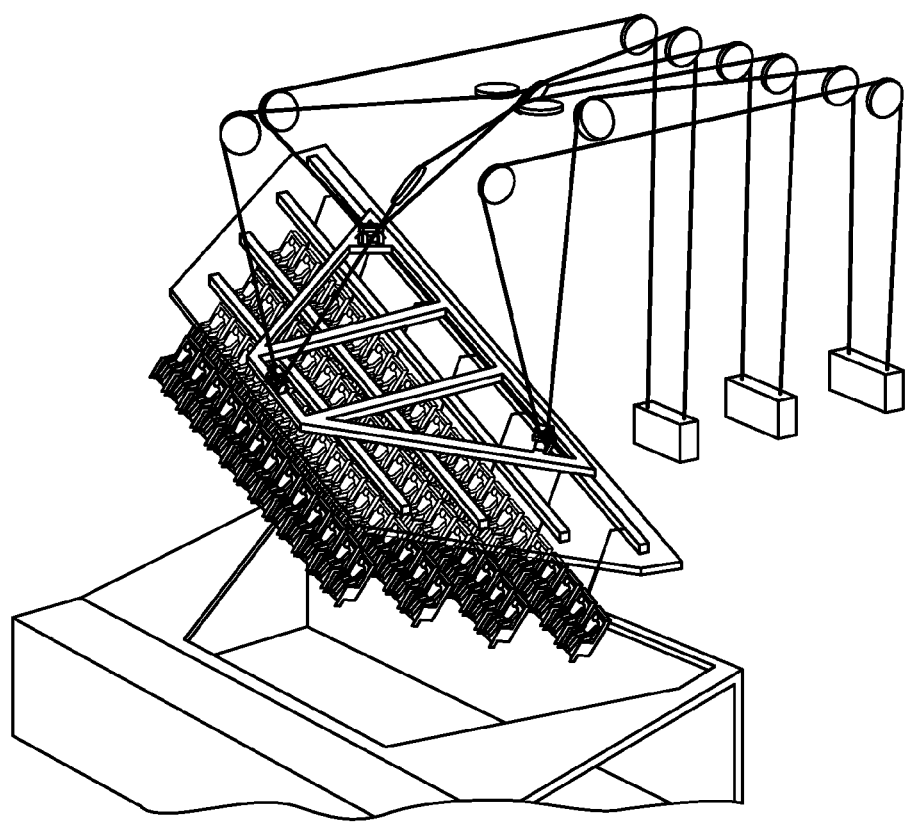
Figure 13C:
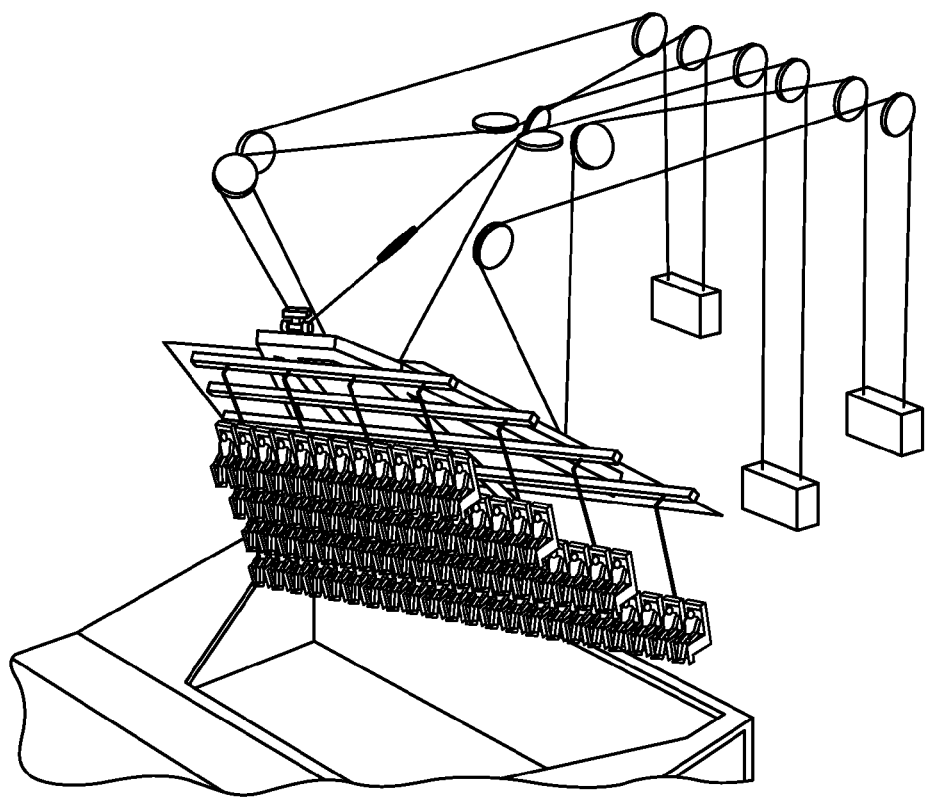
Figure 13D:
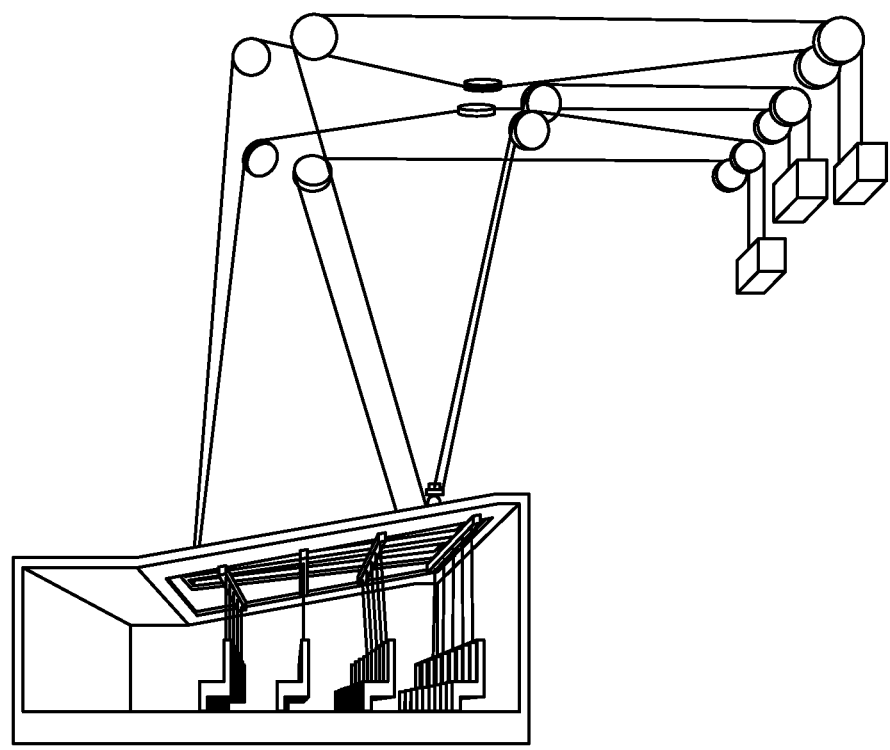
Figure 14:
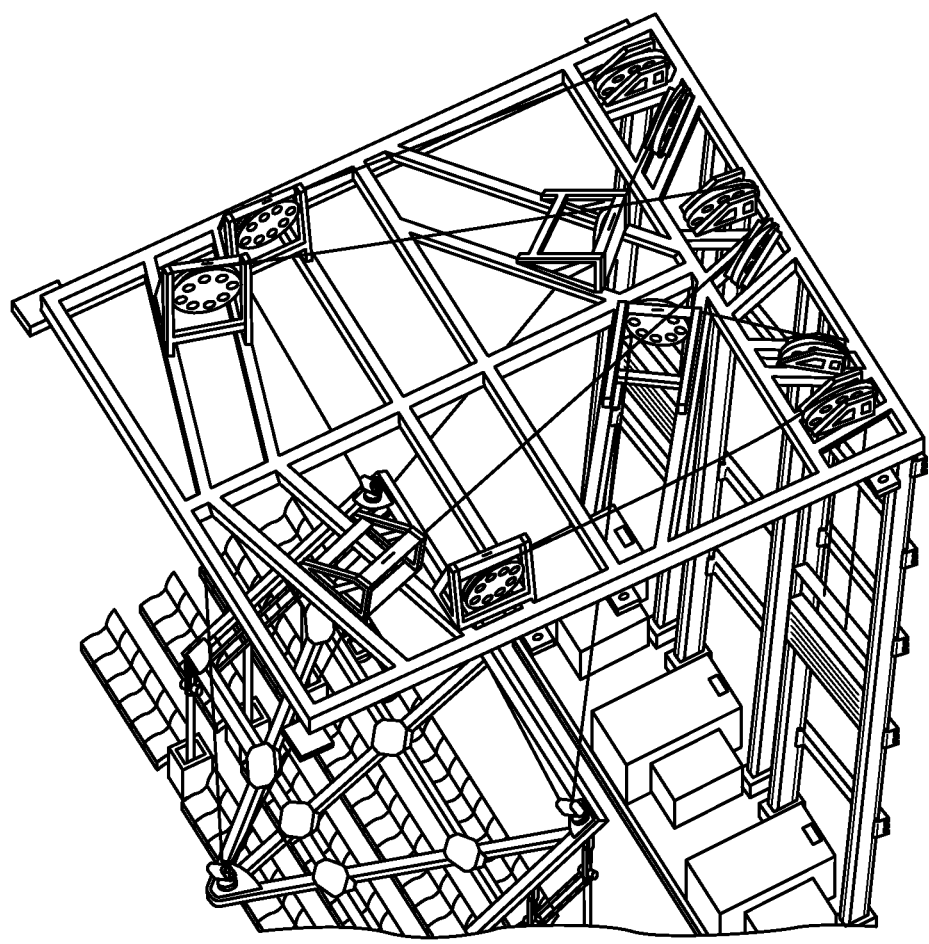
FIGS. 14-15 are view in partial perspective of an exemplary theater system seating arrangements.
Figure 15:
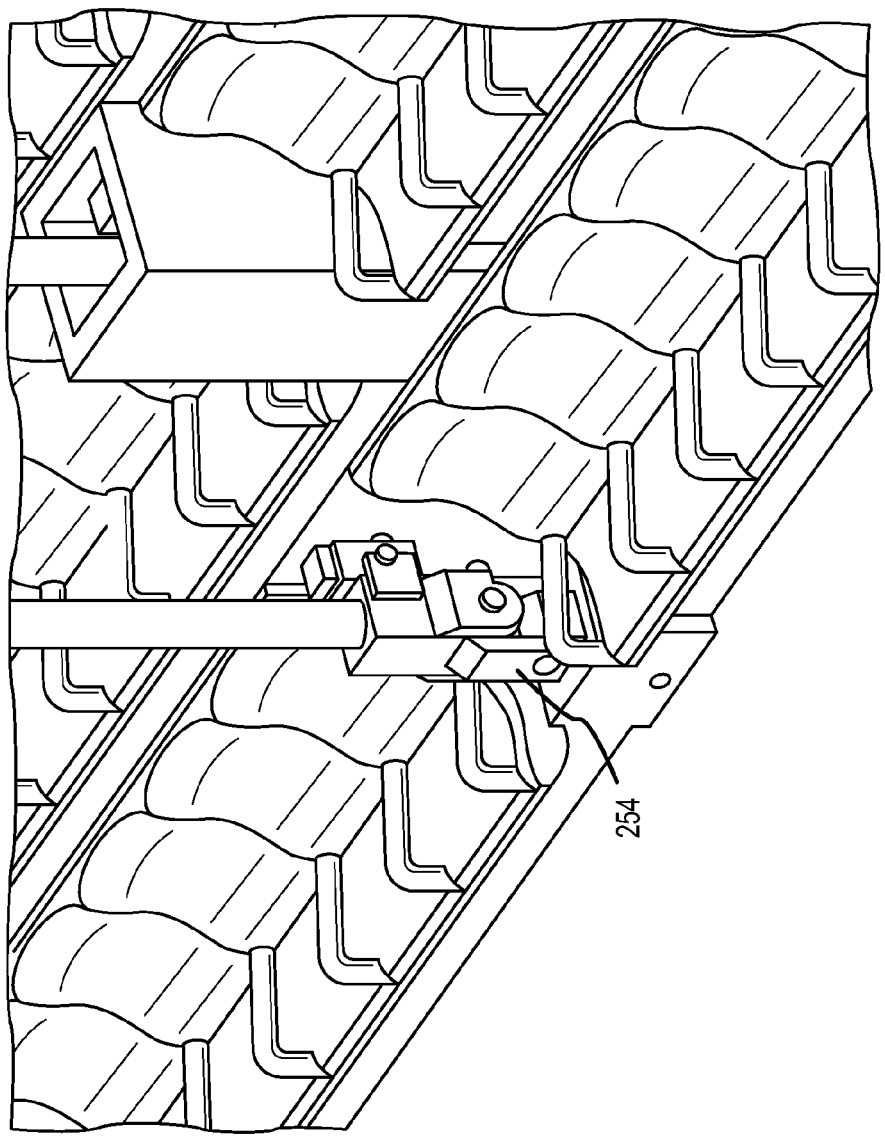

In certain embodiments, passengers move into boarding space such as 305 (FIG. 11) where they board a passenger carrier such as passenger carrier 252 (FIG. 11) or 452 (FIG. 21) while the passenger carrier is in a first or boarding position, e.g. FIG. 12. In various embodiments, theater ride system 300 or 500 may be designed such that, when in boarding space 305, passengers see no indication that they are in a motion simulation theater, e.g. FIG. 11. In other embodiments, theater ride system 300 or 500 may be designed such that when passengers board a passenger carrier such as 252 or 452 they know will be traversing a ride work space.

Figure 7:
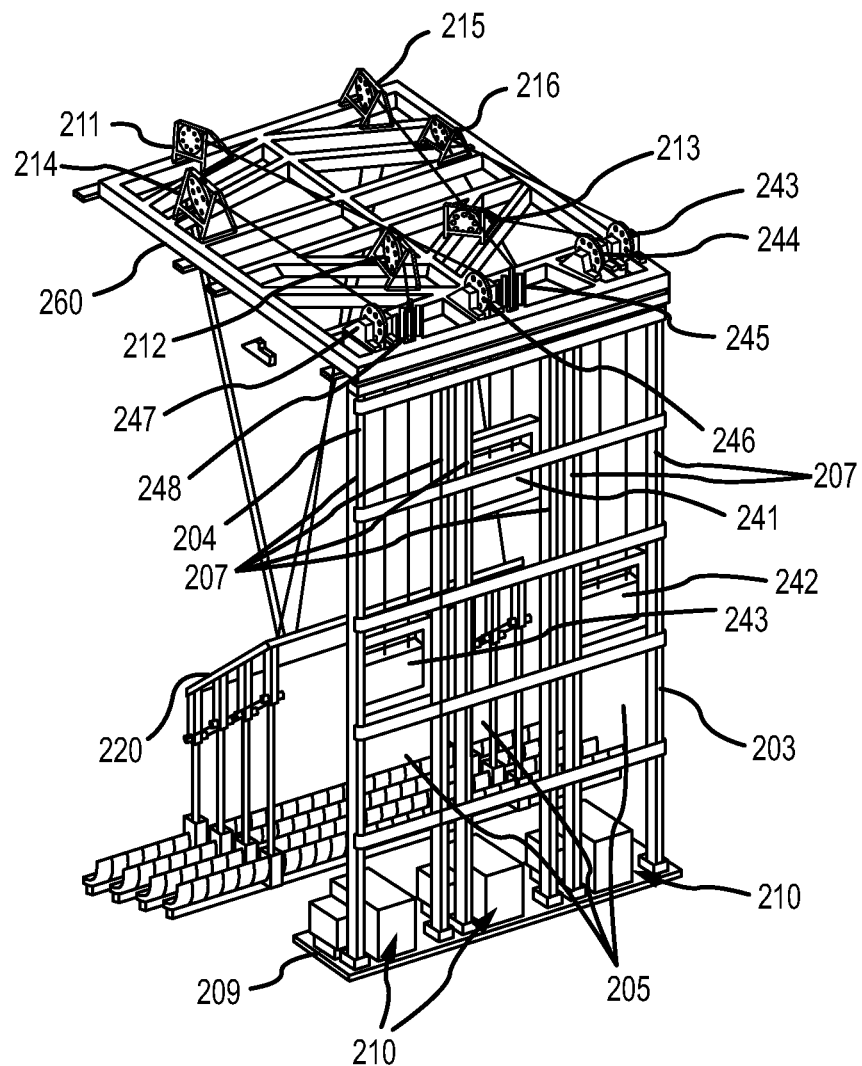
FIG. 7 is a view in partial perspective of an exemplary theater system from a rear view perspective.
Figure 8:
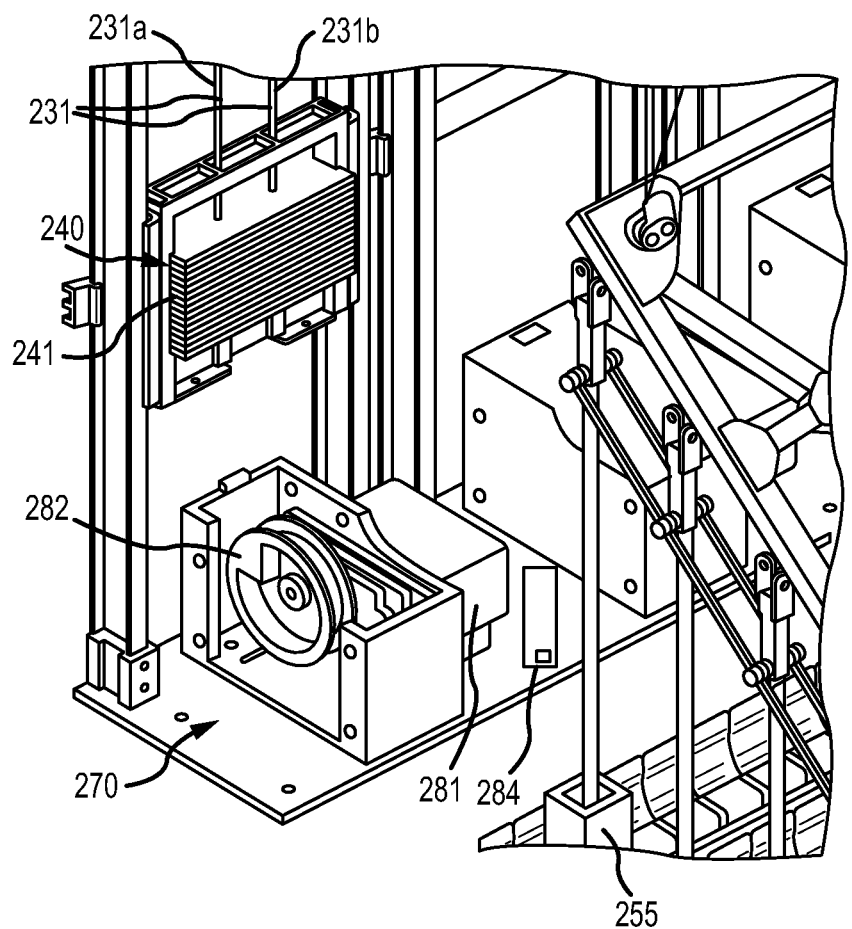
FIG. 8 is a cutaway view in partial perspective of an embodiment of a load carrying system illustrating an exemplary counterweight-winch configuration.
Figure 10A:
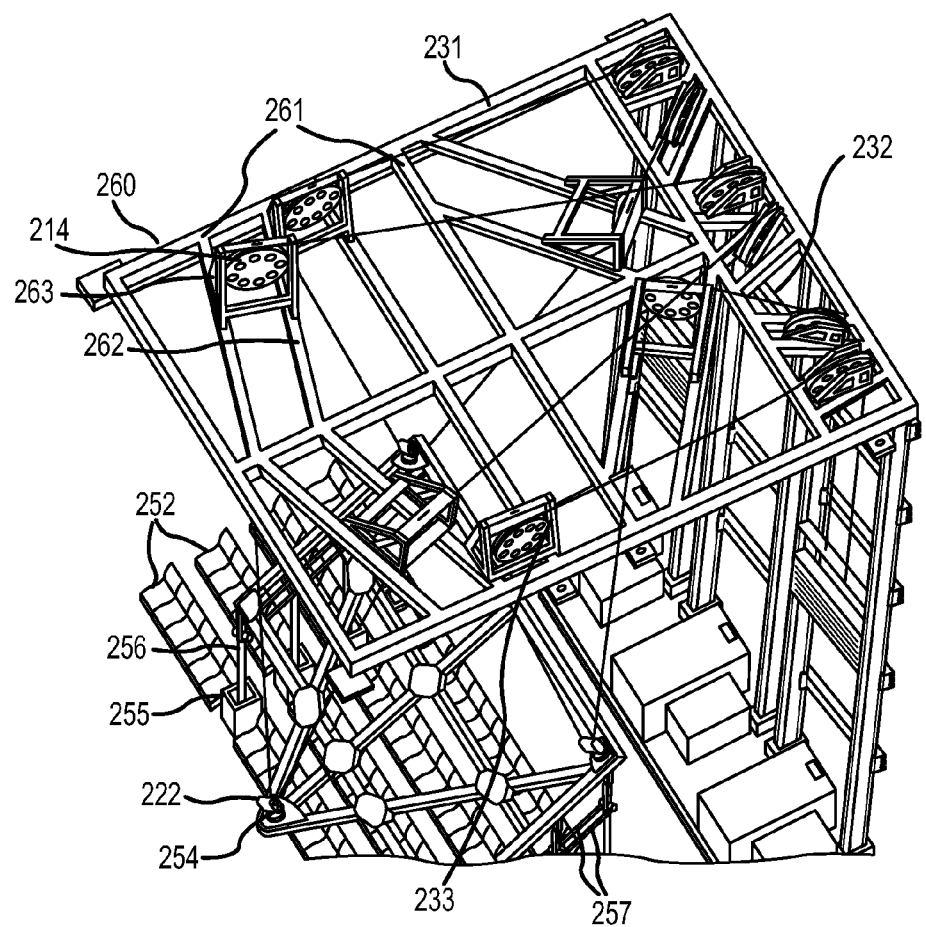
FIGS. 10a-10b are views in partial perspective of an exemplary theater system from a various perspectives, focusing partly on seating.
Figure 10B:
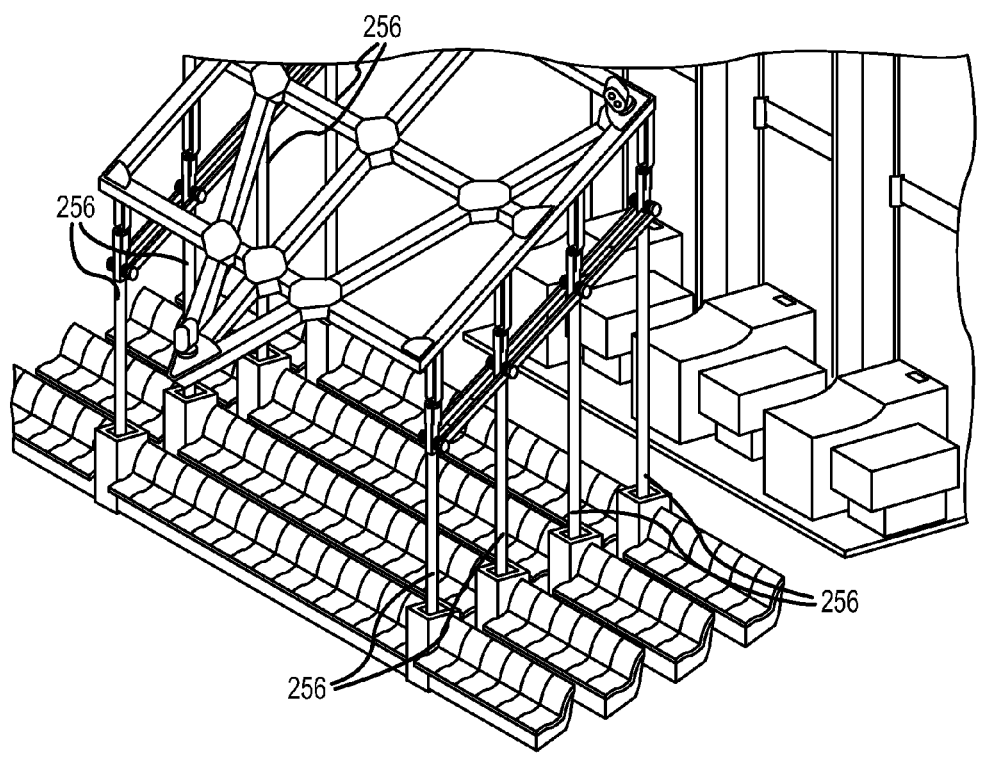
Figure 11:
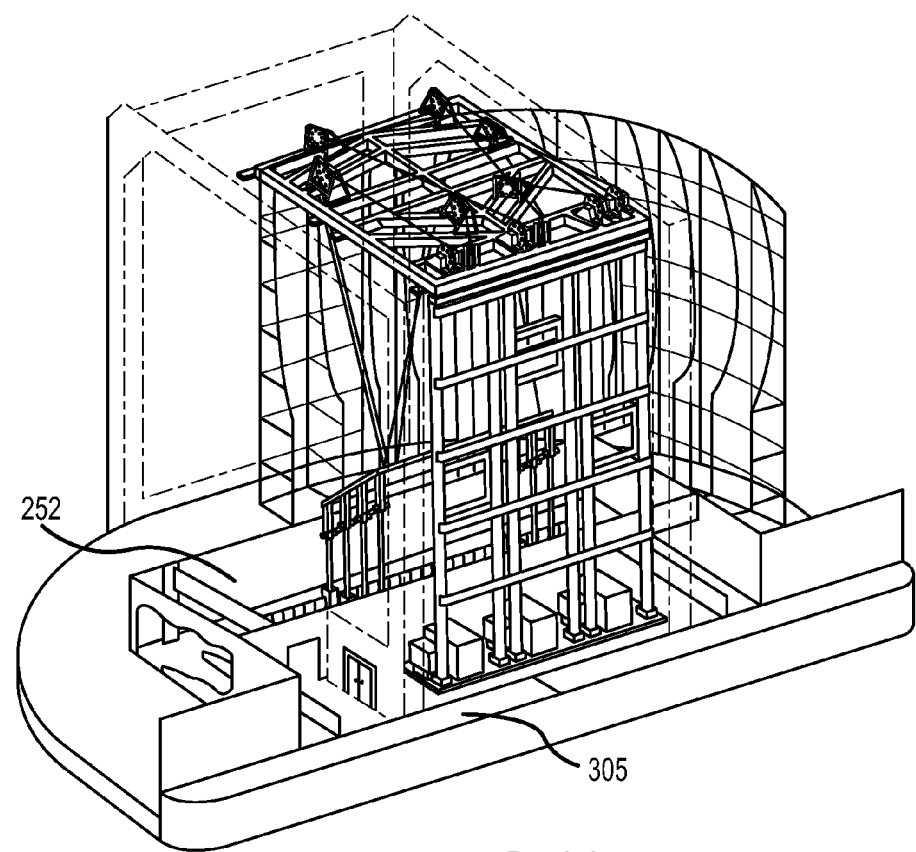
FIG. 11 is a view in partial perspective of an exemplary theater system.
Figure 16:
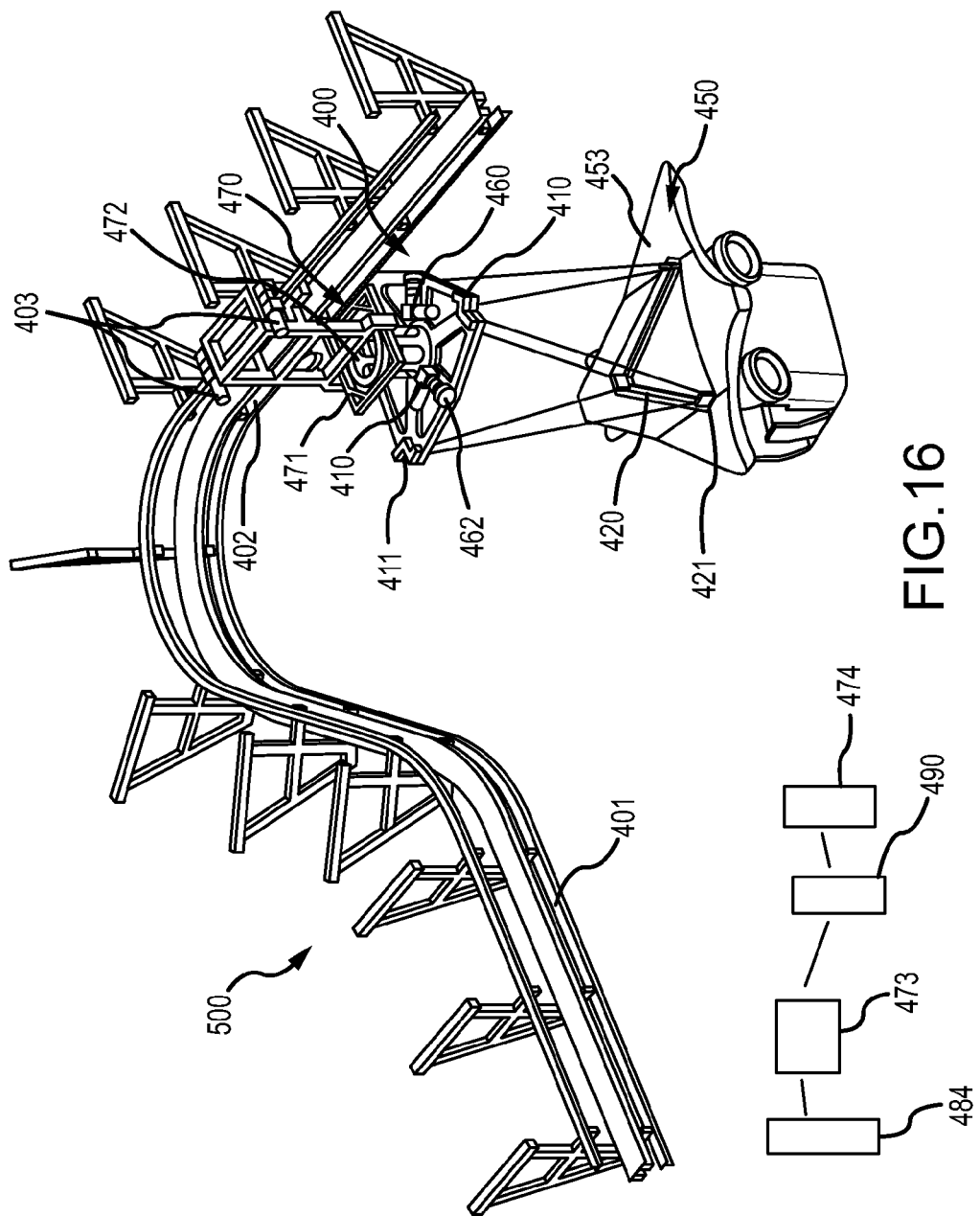
FIG. 16 is a view in partial perspective of a third exemplary load carrying system and a portion of an amusement ride system with block diagrammatic illustrations of various controllers.
Figure 17:
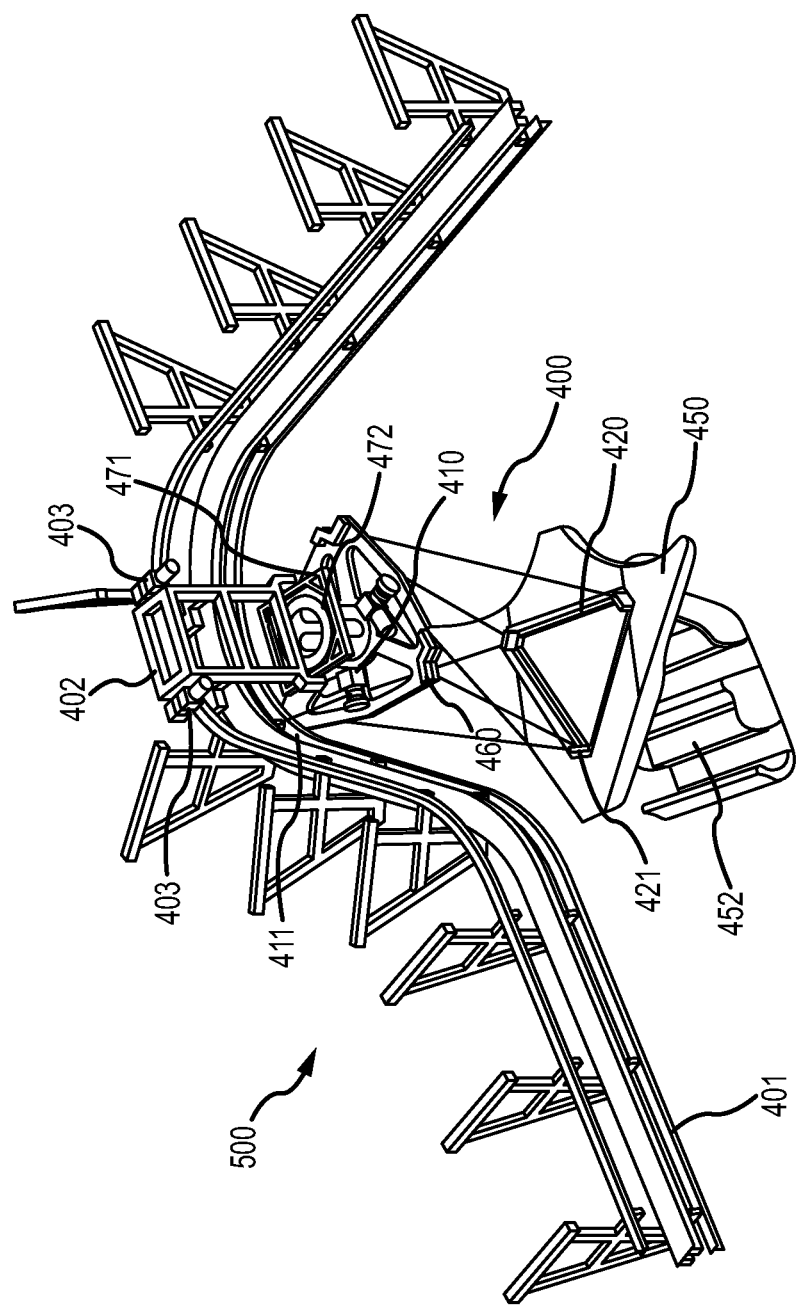
FIG. 17 is a further view in partial perspective of a portion of an amusement ride system.

In some embodiments, after the passengers have boarded, the passenger carrier, e.g. 252 (e.g., FIGS. 12-13d) or 452 (FIG. 16), is moved into one or more further viewing positions, where passengers view 2D or 3D visual images displayed on an image screen such as image screen 302. In certain embodiments, this movement may be achieved by lifting or lowering a passenger carrier such as 252 from cables, e.g. 230, attached to a lifting system such as 260 near the top of the theater and movement is substantially vertical, as illustrated in FIGS. 13a-13d. In other embodiments, a passenger carrier such as 452 is moved along a path such as passenger carrier support 401 (FIG. 16) into one or more further viewing positions, where passengers view 2D or 3D visual images displayed on a screen or items otherwise presented to them, by way of example and not limitation including animatronic figures and the like, as illustrated in FIGS. 16-07. In either embodiment, additional movement may be achieved by lifting or lowering the passenger carrier from cables such as 230 or 430 attached to a load carrying system such as 250 or 450. This lifting may occur while the passenger carrier, e.g. 452, is traversing a path such as passenger carrier transport 402.

In each theater or ride system, the passenger carrier may have multiple rows of seats, which may additionally tilt front to back, optionally with actuators acting upon the seats to create the impression of forward movement.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A seating system, comprising:
   a. a vertical guide, the vertical guide comprising:
      i. a support, comprising:
         1. an upper portion;

2. a lower portion disposed opposite the upper portion; and
3. a counterweight guide disposed intermediate the upper portion and the lower portion; and
ii. a lift support connected to the support proximate the upper portion;
b. a load carrying system supported by the lift support, the load carrying system comprising:
i. a load supporting frame comprising three connection points; and
ii. three lifts configured to be controlled independently with respect to each other to achieve independent vertical positioning of one of the three connection points, the three lifts defining six separate triangles defining separate planes configured to brace against surge, sway and yaw with respect to the frame, each lift comprising:
1. a counterweight movably disposed about the counterweight guide;
2. a controllable winch operatively connected to the counterweight;
3. a set of pulleys; and
4. a cable operatively attached to the controllable winch, routed over the set of pulleys, and routed to a connection point of the three connection points, the cable and the load supporting frame defining two separate triangles of the six separate triangles; and
c. a passenger carrier connected to the frame, the passenger carrier configured to support a plurality of human passengers.

2. The seating system of claim 1, further comprising:
a. a winch controller operatively connected to each controllable winch; and
b. a programmable system controller operatively in communication with the winch controller.

3. The seating system of claim 1, further comprising:
a. three winch controllers, each winch controller operatively connected to a predetermined controllable winch of the three lifts' controllable winches; and
b. a programmable system controller operatively in communication with each winch controller.

4. The seating system of claim 1, wherein the support comprises a plurality of rails, the plurality of rails defining a further plurality of counterweight guides.

5. The seating system of claim 1, wherein:
a. the winches are disposed proximate the bottom portion of the vertical guide; and
b. the set of pulleys are disposed about the lift support.

6. The seating system of claim 1, wherein the cable comprises a first terminal end and a second terminal end, each of the first terminal end and the second terminal end connected to the counterweight.

7. A theater, comprising:
a. a theater space;
b. an image screen disposed within the theater space;
c. a seating system disposed opposite the image screen within the theater space, the seating system comprising:
i. a vertical guide disposed opposite the image screen, the vertical guide comprising:
1. a support comprising:
a. an upper portion;
b. a lower portion disposed opposite the upper portion; and
c. a counterweight guide disposed intermediate the upper portion and the lower portion; and
2. a lift support connected to the support proximate the upper portion;
ii. a load carrying system supported by the lift support, the load carrying system comprising:
1. a load supporting frame comprising three connection points; and
2. three lifts configured to be controlled independently with respect to each other to achieve independent vertical positioning of one of the three connection points, the three lifts defining six separate triangles defining separate planes configured to brace against surge, sway and yaw with respect to the frame, each lift comprising:
a. a counterweight movably disposed about the counterweight guide;
b. a controllable winch operatively connected to the counterweight;
c. a set of pulleys; and
d. a cable operatively attached to the controllable winch,
routed over the set of pulleys, and routed to a connection point of the three connection points, the cable and the load supporting frame defining two separate triangles of the six separate triangles; and
iii. a passenger carrier connected to the frame, the passenger carrier configured to support a plurality of human passengers;
d. a winch controller operatively connected to each controllable winch; and
e. a programmable system controller operatively in communication with the winch controller.

8. The theater of claim 7, wherein the winch controller comprises a separate winch controller for each controllable winch.

9. The theater of claim 7, wherein at least one connection point of the three connection points comprises a swiveling connection.

10. The theater of claim 7, further comprising a substantially inflexible support rod configured to connect the passenger carrier to the load supporting frame.

11. The theater of claim 10, further comprising a cross-bracing piece connected to the substantially inflexible support rod.

12. The theater of claim 10, wherein the cross-bracing piece is swivelingly connected to the substantially inflexible support rod.

13. The theater of claim 7, wherein the connection of the passenger carrier to the load supporting frame comprises a jointed connection.

14. The theater of claim 7, wherein the connection of the passenger carrier to the load supporting frame comprises a support rod disposed intermediate the passenger carrier to the load supporting frame using a U-joint.

15. The theater of claim 7, wherein the support comprises a plurality of rails, the plurality of rails defining a further plurality of counterweight guides.

16. The theater of claim 7, wherein:
f. the controllable winches are disposed proximate the bottom portion of the support; and
g. the set of pulleys is disposed about the lift support.

17. The theater of claim 7, wherein the controllable winch further comprises:
h. a first selectively controllable motor;
i. a first drum operatively connected to the first selectively controllable motor;
j. a second selectively controllable motor; and k. a second drum operatively connected to the second selectively controllable motor.

18. A method of presentation of an image within a theater, comprising:
   a. providing a theater, the theater comprising:
      i. a theater space;
      ii. an image screen disposed within the theater space;
      iii. a seating system disposed opposite the image screen, the seating system comprising:
         1. a vertical guide disposed opposite the image screen, the vertical guide comprising:
            a. a support, comprising:
               i. an upper portion;
               ii. a lower portion disposed opposite the upper portion; and
               iii. a counterweight guide disposed intermediate the upper portion and the lower portion; and
            b. a lift support connected to the tower support proximate the upper portion;
         2. a load carrying system supported by the lift support, the load carrying system comprising:
            a. a load supporting frame comprising three connection points; and
            b. three lifts configured to be controlled independently with respect to each other to achieve independent vertical positioning of one of the three connection points, the three lifts defining six separate triangles defining separate planes configured to brace against surge, sway and yaw with respect to the frame, each lift comprising:
               i. a counterweight movably disposed about the counterweight guide;
               ii. a controllable winch operatively connected to the counterweight;
               iii. a set of pulleys; and
               iv. a cable operatively attached to the controllable winch, routed over the set of pulleys, and routed to a connection point of the three connection points, the cable and the load supporting frame defining two separate triangles of the six separate triangles; and
            c. a passenger carrier connected to the frame, the passenger carrier configured to support a plurality of human passengers;
         3. a winch controller operatively connected to each controllable winch; and
         4. a programmable system controller operatively in communication with the winch controller;
   b. supporting the load carrying system by the lift support;
   c. creating a visual presentation susceptible to perception of movement;
   d. creating a software program to effect movement of the passenger carrier which is synchronized to the visual presentation susceptible to perception of movement;
   e. allowing a passenger to enter the passenger carrier;
   f. displaying the visual presentation susceptible to perception of movement on the image screen;
   g. using the lifts to support the load supporting while bracing against surge, sway and yaw with respect to the frame by altering a relative length of a cable; and
   l. using the software program to control each controllable winch to effect movement of the passenger carrier synchronized to the displayed visual presentation susceptible to perception of movement.

19. The method of presentation of an image within a theater of claim 18, further comprising, for each of the lifts:
   a. connecting a first end of each cable to the counterweight;
   b. routing the cable over an associated set of pulleys;
   c. routing the cable to a predetermined connection point of the three connection points; and
   d. connecting a second end of each cable to the counterweight.

20. The method of supporting a load supported by a frame while bracing against surge, sway and yaw with respect to the frame of claim 18, wherein using the lifts to support the load supporting while bracing against surge, sway and yaw with respect to the frame by altering a relative length of a cable further comprises using the programmable system controller to issue a command to the winch controller to effect a desired position of each counterweight with respect to each counterweight's associated counterweight guide.

* * * * *